Nov. 5, 1968   J. W. RIECK ETAL   3,408,883
ROTARY INDEXING APPARATUS
Filed June 15, 1966   3 Sheets-Sheet 3

United States Patent Office 3,408,883
Patented Nov. 5, 1968

3,408,883
ROTARY INDEXING APPARATUS
John W. Rieck and Arden L. Van Nest, Indianapolis, Ind., assignors to Western Electric Company, Incorporated, New York, N.Y., a corporation of New York
Filed June 15, 1966, Ser. No. 557,789
9 Claims. (Cl. 74—822)

ABSTRACT OF THE DISCLOSURE

A rotary indexing apparatus includes a drive mechanism for rotatable and indexible work members wherein a continuously operated driving gear is coupled to, but only periodically rotates a driven epicyclic type of gear train, the latter also being in continuous engagement with the rotatable work member. Resilient, energy storing members, intercoupled between the driven gear train and the work member, store torsional energy periodically imparted thereto by the driven gear train in response to and during each periodic period in which the rotatable work member is held stationary. The stored energy in the resilient members is, in turn, periodically and rapidly released to the driven gear train each time and in response to the rotatable work member being released for rotation, with the driven gear train thereafter imparting rapid and controllable rotational movement to the work member.

This invention relates to rotary indexing apparatus and, more particularly, to a spring-operated drive mechanism for use with a rotary indexing table. It is an object of this invention to provide new and improved apparatus of such character.

In many manufacturing applications there is a need for a rotary indexing table or turret which is capable of rapidly and precisely indexing a plurality of circumferentially spaced work or article stations thereon into alignment with one or more circumferentially spaced and adjacent stationary work or test stations. Precise indexing is of utmost importance, of course, when small piece parts or articles are involved, and especially where a work function is to be performed directly thereon such as drilling, tapping, cutting, part inserting, etc.

The speed of indexing from one position to the next is likewise of great importance in many applications, especially where there are a number of work stations associated with a given rotary indexing table and/or where the work to be performed encompasses a period of time considerably less than the normal period required to index the table from one position to the next. It is not uncommon that the period of time required to perform many work functions may be less than that required to index a table from one indexible position to the next, or to position an article, piece part or component into a suitable fixture on the table associated with a loading station. Work functions which often require but several seconds, or even a fractional part thereof, may involve electrical testing of a given parameter of a component, the drilling or perforating of a hole in an article, the forming or blanking of an article, or the staking or spot welding of a part to an article, to mention but a few.

When work functions of the foregoing types are to be performed on articles, piece parts or electrical components, and particularly when the articles or the like are of a type conducive to vibratory feeding to a rotary indexing table, the speed of indexing of the table obviously has a great bearing on the efficiency and volume of product which a given table can handle in a given period of time.

Heretofore, most rotary indexing tables have employed some form of directly coupled cam-operated drive, such as the well-known Ferguson drive to provide intermittent indexing of the table from one position to the next. The power source for such a drive is either intermittently operated or continuously operated in conjunction with an intermittently operated clutch.

While such directly coupled cam-operated drives provide adequate indexing of a table in many applications, they are not a panacea for all applications, especially where inexpensive and compact rotary indexing apparatus exhibiting controllable indexing speeds are required.

More specifically, conventional directly coupled cam-operated drives do not allow flexible control, if any, over the rate of speed at which a rotary table may be indexed. As a matter of fact, such drives generally require a new cam unit if the intended standard speed is to be changed. Such drives, with the power off, also do not permit rotation of the table in either direction away from a stationary index position so as to move an article or work carrying fixture on the table out of alignment with apparatus associated with a stationary work station. Such table movement would greatly facilitate tool maintenance or replacement operations or the removal of scrap ends of feed stock, for example.

In addition, directly coupled drives normally require rather expensive overload and/or safety devices or mechanisms designed either to remove electrical power from the driving source or to isolate an operating source from the table whenever the latter is subjected to abnormal rotational forces.

Further, conventional drives for rotary indexing tables generally do not provide readily connectible power take-off facilities above as well as below the table. Overhead drive provisions would prove advantageous in many applications where multiple, cam-operated work stations, for example, are associated with a given table and/or where space requirements restrict the size of a given table, and/or base and the auxiliary apparatus associated therewith.

Another factor which may often weigh against the use of conventional directly coupled cam-operated drives is that they are quite expensive, especially when they must satisfy demanding operating requirements such as effecting relatively rapid and precise indexing of rotary tables having appreciable mass. Moreover, such power drives are also generally quite heavy and bulky, even for tables which are relatively small and of light weight, and intended for use in transporting only articles, piece parts or components of small size and light weight, and wherein no appreciable work forces are imparted thereto.

Accordingly, it is another object of this invention to provide a rotary indexing apparatus which obviates the need for both complex and expensive directly coupled cam-operated drives.

It is an additional object of this invention to provide a drive mechanism for use with rotary indexing tables wherein the speed at which the table coupled thereto may be indexed from one position to the next can be readily controlled for any given application.

It is still another object of this invention to provide a drive mechanism which does not require a direct connection thereof to an associated rotary indexing table, and which permits rotation of the table backward from a locked position at least a distance sufficient that any given work or article carrying fixture thereon may be positioned out of alignment with the apparatus of an associated stationary station.

It is a further object of this invention to provide a simple and inexpensive means for effectively uncoupling the drive mechanism, with a continuously operating power source, from the rotary table whenever the latter is subjected to abnormal rotational forces, thereby protecting the power source from overload and other moving parts of the drive mechanism from possible damage.

It is still a further object of this invention to provide a drive mechanism wherein power take-off facilities are provided for work station apparatus both above and below a rotary indexing table.

It is an additional object of this invention to provide a drive mechanism for rotary indexing tables which is light in weight, of simple and inexpensive construction, and wherein all of the main moving parts are readily accessible for routine maintenance and/or replacement.

In accordance with the principles of the present invention in one illustrative embodiment, a drive shaft extends upwardly through either bushings mounted in, or oversized axial bores in, a rotary indexing table and a spaced intermediate support plate, respectively. A driving gear is affixed near the upper end of the drive shaft in spaced relationship with respect to both the table and the intermediate support plate. The shaft is mechanically coupled to a power source near its lower end beneath the table and, during operation, is driven continuously. A cam-operated locking pin and electro-magnetically operated brake cooperate in effecting rapid stopping and locking of the table at precise rotational positions which are predetermined in accordance with adjustable stop members affixed to the table.

As a part of the drive mechanism, each of a plurality of circumferentially spaced, non-rotatable shafts is supported at its lower end to the table and at its upper end to the intermediate support plate. A separate planetary driven gear is rotatably mounted on each of these shafts near the upper end thereof. Each of the driven gears is positioned coplanar with, and engages the driving gear so as to form an epicyclic type of gear train. A separate helical spring is positioned coaxially of each of the non-rotatable shafts and is adjustably secured at its lower end to the table and is permanently secured at its upper end to the planetary driven gear associated with that shaft.

Accordingly, as the power source continuously drives the axially positioned drive shaft, the driving gear affixed thereto in turn drives the plurality of mutually engaging planetary driven gears, but only during those intermittent periods when the rotary table is in a locked index position. During such periods each of the helical springs, affixed at one end to the locked table and at the other end to the associated rotating driven gear, is wound up, i.e., stores torsional energy. As a result, each time the locking pin is released the total energy stored in the springs causes the associated driven gears to reverse direction of rotation and then rotate more rapidly than the driving gear in the same direction as the latter, thereby advancing about the driving gear (as distinguished from being driven thereby) along an arbiting or circular path. As the table is positively connected to the driven gears through their associated non-rotatable shafts, the table is forced to rotate at the same speed as the driven gears in advancing about the driving gear during each successive unwinding of the springs. The size of the driving and driven gears and the size and stiffness of the springs are chosen such that the driven gears need be rotated less than one complete revolution during each indexing period to effect the desired amount of spring windup and the subsequent rotational displacement of the table.

In order to prevent the drive mechanism from being subjected to excesse overloading, the teeth of the driven gears are segmented, i.e., a number of successive teeth in each gear are removed along a short peripheral portion thereof. With the driven gears constructed as such, any abnormal resistance which could prevent rotation of the table from one index position to the next will result in these gears being driven (and the springs wound up) only until their peripheral portions without teeth are adjacent the teeth of the driving gear. This requires less than one full revolution of the driven gears. At this point the driven gears, under the reverse rotational biasing action of their associated springs, essentially operate as released ratchets with the resultant effect of disengaging or uncoupling the drive mechanism (including the continuously operated power source) from the table. Without such segmented planetary driven gears, or some other overload protecting device or mechanism, the power source could be overloaded and/or the helical springs, as well as other moving parts of the rotary indexing apparatus, could be damaged.

A spring-operated drive mechanism for rotary tables has thus been briefly described which, depending on such factors as the number of driving springs employed, the degree of preloading of the springs and the stiffness thereof, allows the speed at which a given table is indexed from one stationary position to the next to be controlled within a wide range of values. What is of particular importance, however, is the fact that a very rapid, snap-action type of indexing can be effected with a relatively simple, inexpense, rugged and reliable drive mechanism which obviates the need for a directly coupled cam-operated drive and the aforementioned attendant disadvantages realized therewith. The present drive mechanism also permits power operated work station apparatus, for example, to be coupled to the main drive shaft from positions therealong which are both above and below the rotary table.

These and other objects, features and advantages of the present invention will become more fully understood from a consideration of the following description and related accompanying drawings, in which:

FIG. 4 is an enlarged, fragmentary perspective view of an adjustable locking fixture associated with the rotary table.

Figure 1:
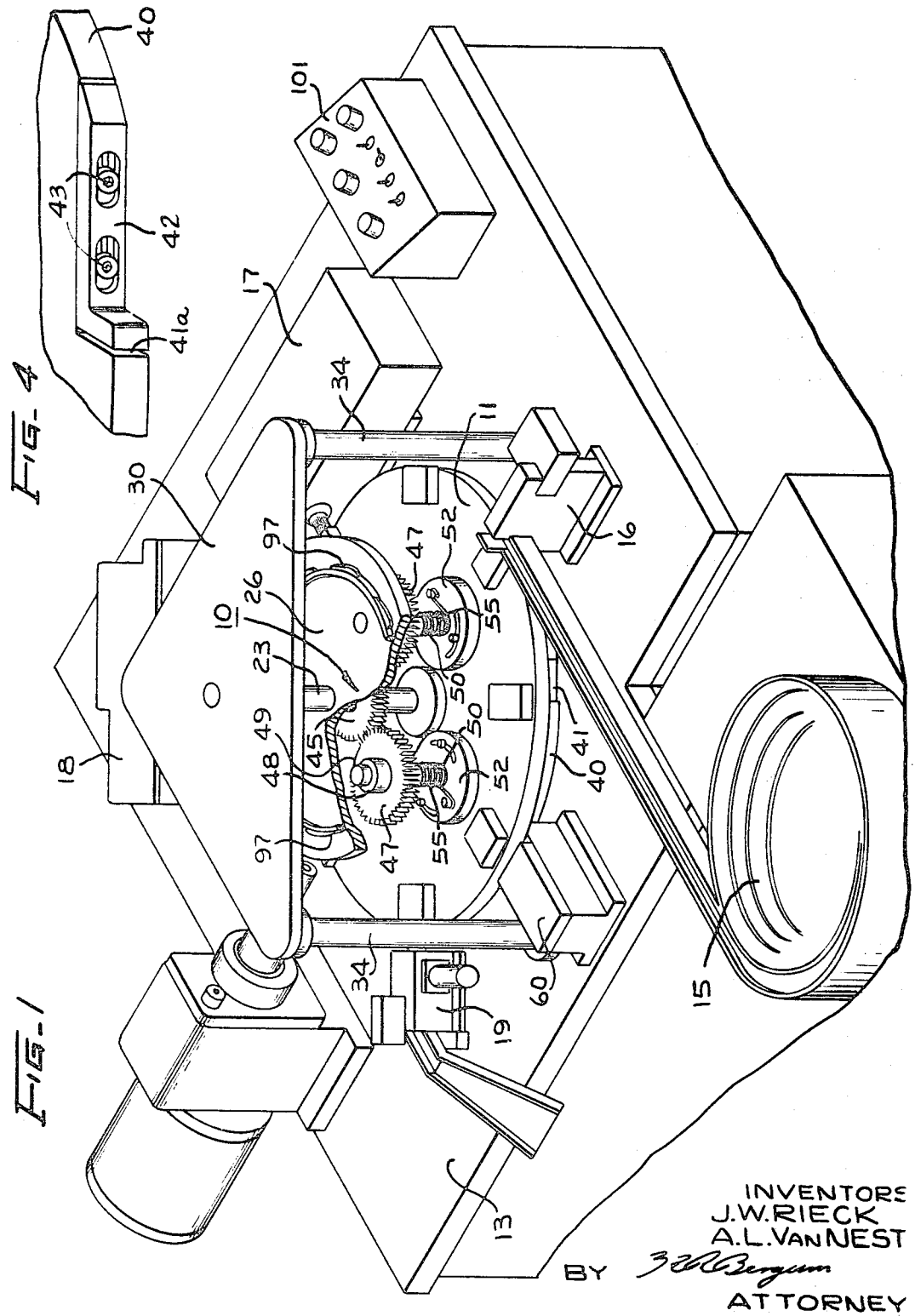
FIG. 1 is a perspective view, partially broken away, illustrating a drive mechanism and an associated rotary indexing table in accordance with a preferred embodiment of the invention.

Considering now the drawings in greater detail, as illustrated in FIG. 1 a drive mechanism embodying the principles of the present invention and designated generally by the reference numeral 10 is associated with a rotary indexing table 11 mounted on an enclosed supporting base 13. For purposes of illustrating a typical operating application only, a vibratory feeder 15 is shown for automatically feeding articles to a transfer station 16, and subsequently to two representative work stations 17 and 18, and finally to an eject station 19. In the interest of simplicity, the apparatus and/or fixtures normally associated with the work stations have ben shown only pictorially, as structural details relating thereto are not required in order to gain an understanding of the novel features of the drive mechanism and rotary table associated therewith in accordance with the present invention.

Figure 2:
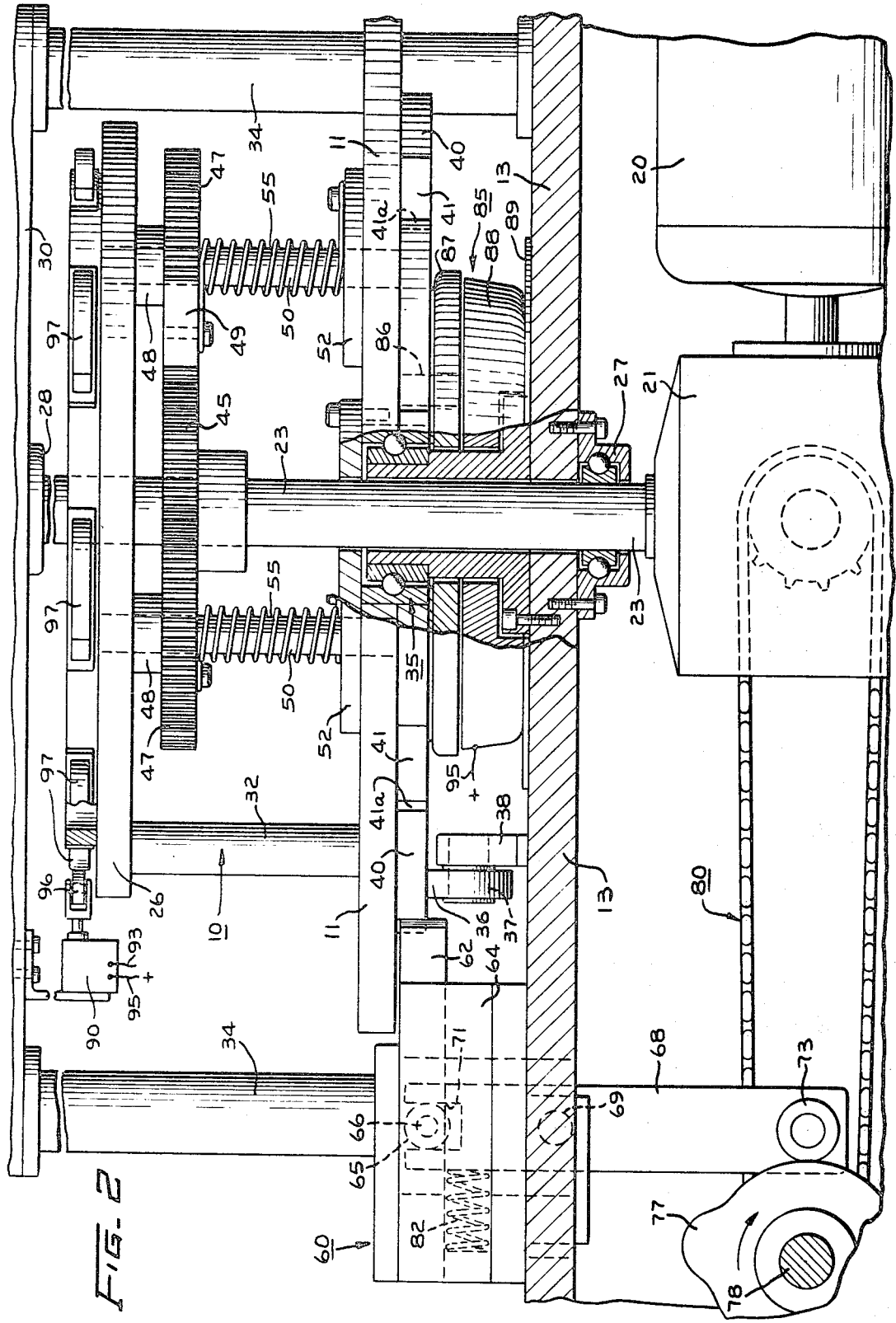
FIG. 2 is a front elevational view, partly in cross-section, illustrating the main structural features of the drive mechanism in accordance with the principles of the present invention.

As best seen in FIG. 2, a power source 20, such as a conventional electric gear motor, is employed to drive a gear reducer 21 which in turn drives a vertically extending drive shaft 23. This shaft extends through oversized axial bores in both the rotary table 11 and in an intermediate, circular support plate 26. The shaft 23 is supported at its lower and upper ends by radial ball bearing assemblies 27 and 28, the outer housings of which are affixed to the undersides of the support base 13 and an upper support plate 30, respectively.

The intermediate support plate 26 is supported by three equilaterally spaced support members 32 (one being shown fully in FIG. 2) which are secured at their lower ends to the table 11. The upper support plate 30, which is triangularly shaped in the illustrative embodiment, is supported at each corner by a support member 34 which is secured at its lower end to the upper surface of the support base 13.

As best seen in FIG. 2, the rotary table 11 is supported by a center radial ball bearing assembly designated generally by the reference numeral 35, and three equilaterally spaced roller bearings 36 which ride along a circular path on the bottom surface of an indexing plate 40. This plate is secured to the underside of the rotary table 11. The bearings 36 are respectively mounted on shafts 37, the latter being secured to associated support brackets 38 which, in turn, are attached to the top surface of the support base 13.

In the preferred illustrative embodiment, the plate 40 is made of hardened steel and has eight tapered notches 41 (best seen in FIG. 3) circumferentially spaced about the peripheral edge thereof, each notch 41 defining an index position for the rotary table. The terminating ends 41a of the notches are formed by adjustable inserts 42 (best seen in FIG. 4) affixed to the plate 40 by fasteners 43 so as to allow each terminating end 41a to be precisely spaced with respect to every other notched end in the plate 40. By way of example, in one constructed embodiment of the present invention, the steel plate 40 measured 24" in diameter and the eight notches were spaced such that they were ±.001" of being exactly spaced relative to each other. This degree of tolerance could readily be made even closer if so desired for a given demanding application.

In the constructed embodiment, the reducer 21 associated with the main drive shaft 23 provides an 8-to-1 reduction in input versus output shaft rotation. Accordingly, one revolution of the input shaft of the reducer 21 results in the main drive shaft 23 rotating one-eighth revolution or 45°, which is equivalent to the increment of rotation of the table from one index position to the next. This choice of input and drive shaft rotation speeds, when related to the eight index positions of the table, greatly facilitates the utilization of cam-operated control mechanisms for effecting precise braking and locking of the table at the eight indexible positions.

In accordance with an aspect of the invention, a driving gear 45 is affixed to the drive shaft 23 above the table 11, and three planetary driven gears 47 are arranged in circumferentially spaced relationship about the driving gear 45 and in mutually engaging relationship therewith. The driving gear 45 and the peripherally engaging driven gears 47 thus form an epicyclic type of gear train. Each of the driven gears 47 is segmented, i.e., each has a peripheral portion 49 along which a number of teeth are removed (ten in the illustrative embodiment). The significance of these segmented gears in providing overload protection for the drive mechanism will be described in greater detail hereinafter. It is to be understood, of course, that the particular use of three driven gears is shown only for purposes of illustration, and the exact number of driven gears may vary, depending upon such factors as the size and weight of the rotary table, and the diameters chosen for the driving and driven gears.

Each of the driven segmented gears 47 is rotatably mounted on a different non-rotatable support shaft 50 by a bushing 48 (best seen in FIG. 2). Each of these shafts is rigidly supported at its lower end to the table 11 by means of an angularly adjustable bracket 52. The upper end of each shaft extends into an aligned bore of and is secured to the intermediate support plate 26 by any suitable means. It is to be understood, of course, that the support shafts may be suitably mounted to rotate with their associated driven gears if desired.

A helical spring 55 is positioned coaxially of each of the non-rotatable shafts 50, and is secured at its lower end to the adjustable support bracket 52 and at its upper end to the associated driven segmented gear 47. In the case of one preferred constructed embodiment, the springs were placed under 90° of preload so as to propel the rotary table 11 from one index position to the next in one third of the total index cycle time, which was 2.6 seconds. The amount of preloading required, of course, will depend on such factors as the size and stiffness of the springs, the number of springs employed, the mass of the table to be rotated, and the index period. The significant aspects of the described spring drive will be considered in greater detail hereinbelow in conjunction with a description of a typical operating cycle for the composite apparatus.

A cam-operated positive locking and releasing mechanism for the rotary table 11 is designated generally by the reference numeral 60. As best seen in FIG. 2, this mechanism includes a longitudinally slidable locking pin 62 which is supported within a channel-defining member 64, the latter in turn being mounted on the upper surface of the support base 13. A roller 65 is rotatably mounted on a shaft 66 which extends outwardly from one edge of the slidable locking pin. A lever 68, mounted for pivotal movement about a pin 69 secured to the base member 13, has a U-shaped cutout portion 71 at its upper end, which accommodates the roller 65, and has a cam follower 73 rotatably mounted thereon near its lower end.

An unlatching cam 77 (best seen in FIG. 2) is affixed to a cam shaft 78 and has an outer periphery which continuously engages the cam follower 73. Cam shaft 78 is mechanically coupled to the input side of the reducer 21 by means of a chain and sprocket drive designated generally by the reference numeral 80. With this drive having a 1-to-1 speed ratio, cam shaft 78 makes one complete revolution during each index-period-defining 45-degree increment of rotation of the drive shaft 23. This facilitates the dimensioning of the unlatching cam 77 so as to effect precise timing of the retraction and advancement of the locking pin 62 during each index period.

With respect to timing, the locking pin 62 is rapidly retracted from notch 41 to thereby release the table at the completion of a given 45-degree increment of rotation of the drive shaft 23 (one complete revolution of the cam shaft 78). Such rapid retraction of the pin 62 is effected by an abrupt increase in radii along that portion of the peripheral edge of the cam 77 then in contact with the cam follower 73, which change in cam radii causes the lever 68, coupled to the pin 62 at one end, to pivot rapidly an incremental distance counterclockwise. A spring 82 is positioned in the channel member 64 and biases against the rearward end of the pin 62 to thereby insure that the cam follower 73 is always firmly biased against the locking cam 77.

Immediately after the locking pin 62 has been retracted to release the table, and at the start of the next 45 degree increment of rotation of the drive shaft 23, the pin is advanced toward the peripheral edge of the steel index plate 40 until it makes contact therewith. From that point in time until the end of a given index period when the pin makes contact with the terminating end 41a of a particular notch 41 to lock the table, the pin is continuously urged against the peripheral edge of the rotating plate 40 by the biasing action of the spring 82. The advancement of the locking pin is effected not only by the spring 82, but by a decrease in radii along that portion of the peripheral edge of the cam 77 then in contact with the cam follower 73 which causes the lever 68 to pivot an incremental distance clockwise, thereby causing the locking pin 62 to advance until it contacts the indexing plate 40.

In order to decelerate the table just prior to being abruptly and positively stopped at each successive index position by the aforementioned locking mechanism 60, an electromagnetically operated brake 85 (best seen in FIG. 2) is employed in conjunction therewith. The brake 85 is positioned between the indexing plate 40 and the upper surface of the base 13, and is coaxially of but in non-contacting relationship with the drive shaft 23.

The armature portion 87 of the brake 85 is coupled to the bottom side of the indexing plate 40 by three equilaterally spaced and spring biased armature pins 86 (only one being shown in FIG. 2). The armature portion of the brake is rotatable (together with the plate 40 and table 11) relative to a stationary field winding portion 88 which is secured to a steel plate 89 mounted on the top surface of the support base 13. The armature portion is movable in the vertical (axial) direction against the spring bias of the pins 86 and, when voltage is applied to the field winding, is pulled downwardly, i.e., away from the underside of the indexing plate 40 by approximately 3/64". When this happens, the armature portion 87 is electro-magnetically biased downwardly against the stationary field winding portion 88 mounted on the base 13, and thereby effects dynamic braking of the rotary table 11. Further details of the brake are not deemed necessary herein as it may comprise any one of a number of conventional types, the one employed in a preferred embodiment being designated Model PB1000, manufactured by the Warner Electric Co., of Beloit, Wis.

Figure 3:
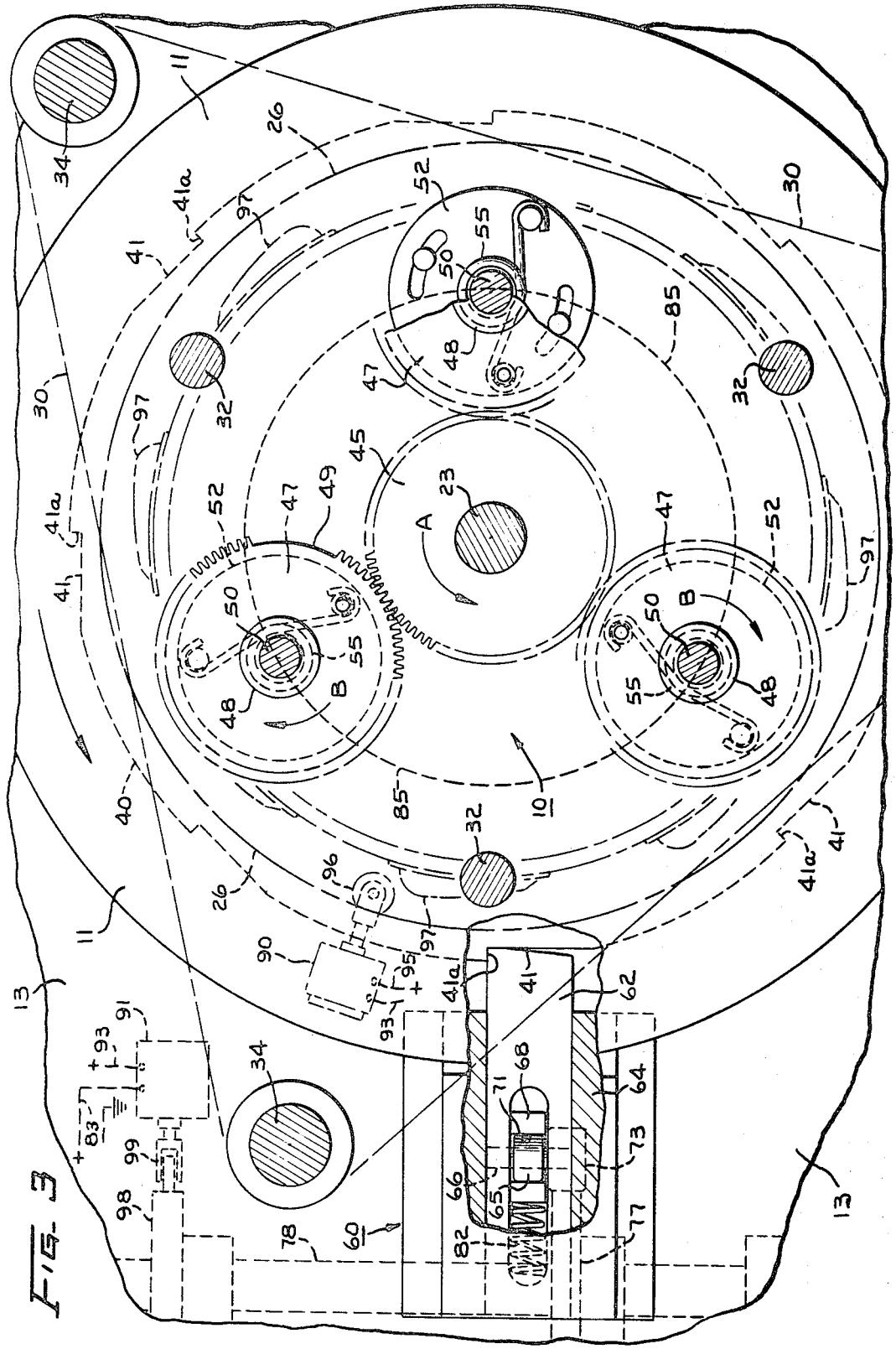
FIG. 3 is an enlarged, fragmentary plan view with certain of the structural features of the overall rotary indexing apparatus depicted in FIG. 1 being shown at least partially in phantom.

The operating voltage for this particular brake is 90 volts D.C., and is supplied from a voltage source indicated only symbolically by the terminals 83 (FIG. 3). This voltage is intermittently supplied to the brake 85 through the selective actuation of two microswitches 90 and 91 (both being shown only pictorially in FIG. 3), these switches being connected in series by a common lead 93 shown in detached form. A lead 95 (shown in detached form) associated with microswitch 90 completes the electrical energization circuit for the brake 85. It is assumed that a common ground is associated with both microswitches and the brake 85. As these microswitches are in series they both, of course, must be actuated to be closed at the same time during some portion of each indexing period in order to complete an electrical circuit to energize the electro-magnetic brake 85.

In the illustrative embodiment, microswitch 90 and a cam follower 96 associated therewith are secured to the underside of the upper support plate 30. The cam follower 96 is positioned to make successive contact with a plurality of adjustable cam members 97 circumferentially spaced about the upper surface of the intermediate support plate 26. During the periods in which the cam follower 96 is in contact with the cam member 97, the microswitch 90 is closed so as to partially complete the electrical circuit for the brake 85. By being adjustable, cam members 97 allow control over the circumferentially spaced points on plate 26 (and thereby on the rotary table 11 at which the microswitch 90 is actuated.

It should be understood, of course, that cam members 97 may be positioned either on the table 11, the steel plate 40 or on apparatus associated with the stationary work stations, with the microswitch 90 being suitably mounted for selective actuation thereby.

Microswitch 90 operates as a table position limit switch and senses the instant in time at which the table in indexing from one position to the next has traveled a predetermined portion of such distance. Only at that time is the electro-magnetic brake energized so as to dynamically decelerate further rotational movement of the table prior to its arriving at a given index position whereat it is positively locked momentarily by the mechanism 60. As such, microswitch 90 is only responsive to the degree of angular displacement of the table 11 in moving from one index position to the next, and in no way is dependent upon the angular position of the continuously rotating drive shaft 23.

The fact that drive shaft 23 has no control over the operation of microswitch 90 is important in that any external condition that could possibly prevent rotation of the table or reduce the normal indexing speed thereof, such as scrap material becoming lodged between the peripheral edge of the rotary table and the stationary base, or a malfunction in any work station apparatus, for example, will not result in a premature energization of the brake 85 before the table has actually traveled a predetermined, but major portion of the distance from one given index position to the next. Stated another way, if microswitch 90 was operated by a cam directly coupled either to the power source or to the drive shaft 23, and if something impeded the normal indexing speed of the table after having been released by the locking mechanism 60, the brake could be energized prematurely and thereby apply sufficient braking action to prevent the table from ever reaching the next succeeding index position.

The microswitch 91, however, is sequentially actuated by the positively driven cam shaft 78. More specifically, a cam 98 is secured to the cam shaft 78 (as depicted in FIG. 3) with a cam follower 99 effecting operation of the microswitch 91. The cam 98 is constructed such that the cam follower 99 maintains the microswitch 91 closed so as to partially complete an electrical energization circuit for the brake 85 during at least the latter portion, and preferably the major portion of each successive indexing period. Only during a short period of time just prior to and after release of the table by the locking mechanism 60 is it important that cam 99 effect the opening of the microswitch 91. This insures that the brake will always be deenergized after the table has arrived at or should have arrived at a given stationary index position.

With the structural features of the spring operated drive mechanism and the braking and locking apparatus associated with the rotary indexing table having been described in detail, the mode of operation thereof and the significance of the helical springs 55 in effecting intermittent indexing of the table will now be described in greater detail.

Upon the apparatus start button or switch (shown only symbolically in FIG. 1) being depressed on a control panel 101 so as to initiate operation of the gear motor 20, the drive shaft 23 is thereafter directly coupled to the motor through the reducer 21 and thus, is continuously driven until such time as the motor is intentionally stopped. The continuously rotating drive shaft 23 in turn effects continuous rotation of the driving gear 45 in a counterclockwise direction as indicated by the arrow A in FIG. 3. This direction of rotation of the driving gear in turn causes the planetary driven segmented gears 47 to rotate about their axis in a clockwise direction, as indicated by the arrows B in FIG. 3, through an angle of rotation less than 360 degrees, whereby the teeth in the driven gears are normally always in mutual engagement with those in the driving gears 45.

Such rotation, with the indexing table 11 being momentarily locked at a given stationary index position, causes the helical springs 55 to wind up, i.e., store torsional energy therein. The amount of energy stored will, of course, depend on such factors as the stiffness and size of the springs, as well as on the period of time during which they are subjected to torsional force.

Upon the release of the slidable locking pin 62, effected by the cam-operated pivotal movement of the lever 68, each of the helical springs 55 releases its stored energy, i.e., unwinds to produce a torsional force which causes the associated planetary segmented gears 47 to abruptly stop rotating in the clockwise direction and rapidly start rotating in the opposite (counterclockwise) direction at a faster speed than normally effected by the continuously rotating driving gear 45.

The resultant epicyclic movement of the driven gears 47 in unison about the driving gear 45 causes the rotary table 11, which is coupled to the driven gears 47 through the shafts 50, to rotate until either the stored energy in the helical springs 55 has been expended or until the electro-magnetic brake 85 and locking mechanism 60 has caused the table to stop rotating at a given one of the index-locked positions. Either condition will result in the preferred embodiment with the driven gears being rotated less than 360 degrees such that the teeth therein always remain in natural engagement with those in the driving gear 45. At such time, the helical springs are again subjected to torsional force or stress so as to wind up and thereby again store torsional energy therein.

With a proper choice of springs and indexing positions for a given rotary table, the springs can produce a type of rapid snap-action indexing between one position and the next that is normally impossible to achieve with conventional cam-operated drives continuously coupled in a positive manner to the table.

The significance of utilizing segmented driven gears 47 becomes of particular importance in the event that the table should experience abnormal resistance to rotation upon being released for indexing from one index position to the next. If this should happen, the driving gear 45 would continue to drive the driven gears 47 (less than 360 degrees) until the peripheral portions 49 thereof without teeth were positioned adjacent the teeth in the driving gear. At this point the fully wound springs 82 would tend to rotate the driven gears 47 in the opposite direction (counterclockwise), even though prevented from doing so because of the abnormal rotational forces preventing free rotation of the table. As a result, the segmented driven gears act essentially as released ratchets and effectively uncouple or disengage the driven mechanism (including the continuously operated power source) from the rotary table. This not only protects the power source from excessive overload, but protects the helical springs 82, as well as other moving parts of the rotary indexing apparatus, from possible damage. The amount of angular displacement of the driven gears 47 required before the segmented peripheral portions 49 thereof are adjacent the teeth of the driving gear 45 will normally depend upon such factors as the amount of angular rotation of the driven gears required to establish both the desired degree of pre-loading, if any, and the necessary magnitude of active force-producing stored torsional energy in the springs. In one preferred constructed embodiment utilizing the previously mentioned 90° of preload, only 45° of additional driven gear rotation was required in order to establish the desired amount of stored torsional energy in the springs through the windup thereof. Accordingly, the segmented peripheral portions 49 of the driven gears 47 were positioned such that any rotation thereof beyond 45° from the initial, static, pre-loaded position would result in the segmented portions being positioned adjacent the teeth of the driving gear 45 and, thereby, effect the release of the drive mechanism from the rotary table.

From the foregoing description of the unique spring-operated drive mechanism and rotary table associated therewith as embodied herein, it has become readily apparent that the drive mechanism is of simple, economical, and rugged construction, and provides rapid and precise indexing of a table or turret through a plurality of index positions which may vary substantially in number and in the time of indexing between successive ones in accordance with the principles of the present invention. The present drive mechanism also eliminates the need for expensive and bulky mechanically operated clutches often employed with cam-operated drives. Further advantages of the present drive mechanism are that it provides overhead power facilities, is readily rotated manually in either direction from a rest position with the power off (against the biasing action of the springs), and incorporates simple and reliable overload protection means (driven gears with segmented teeth).

What is claimed is:

1. A rotary indexing apparatus comprising:
 a rotatable and indexible work member;
 means for locking the rotatable work member at each of a plurality of spaced index positions and after a predetermined period of time at each locked index position releasing the rotatable work member for rotation about its axis to the next succeeding index position;
 drive means normally continuously operated;
 driven means at least normally coupled to and periodically rotated by said drive means, said driven means also being positioned to engage the rotatable work member at a point spaced at least an appreciable distance from the axis thereof; and
 resilient storing means intercoupled between said driven means and said rotatable work member, said storing means storing torsional energy imparted thereto periodically by said driving means through said driven means in response to and during each periodic period in which the rotatable work member is locked in a stationary index position, said storing means rapidly releasing said stored energy periodically to said driven means in response to the rotatable work member being released for rotation, said driven means upon receiving said stored energy imparting rotational movement to the rotatable work member in engagement therewith.

2. A rotary indexing apparatus in accordance with claim 1:
 wherein said drive means includes a drive shaft extending upwardly through an axial bore in said rotatable work member, said drive shaft being free to rotate relative to said rotatable work member and having a driving gear affixed to an upper portion thereof in spaced relationship with respect to said rotatable work member; and
 wherein said driven means includes at least one driven gear normally mutually engaging said driving gear and rotatably mounted on a support shaft, said support shaft being connected at its lower end to said rotatable work member.

3. A rotary indexing apparatus in accordance with claim 2:
 wherein said driven gear is segmented by having a short arcuate portion along the periphery thereof without teeth, said portion of the driven gear without teeth preventing the driving gear from rotating the driven gear through an angle greater than that defined by the peripheral portion of the driven gear with teeth.

4. A rotary indexing apparatus in accordance with claim 1:
 wherein said driven means includes a plurality of circumferentially spaced driven gears positioned normally to mutually engage said driving gear and to form an epicyclic type of gear drive, each of said driven gears being rotatably mounted on a different support shaft connected at its lower end to the rotatable work member; and
 wherein said resilient storing means comprises a plurality of helical springs positioned coaxially of said support shafts, respectively, each of said helical springs being secured to the rotatable work member at its lower end and to the associated driven gear at its upper end.

5. A rotary indexing apparatus in accordance with claim 4:
 wherein each of said driven gears is segmented by having a plurality of successively adjacent teeth removed along a short peripheral portion thereof, said portion of each driven gear without teeth preventing the driving gear from rotating any of the driven gears through an angle greater than that defined by the peripheral portion of each driven gear with teeth, said segmented driven gears thereby preventing the springs respectively secured at one end thereto from being wound up excessively should the rotatable work member be prevented from rotating at the proper time from one index position to the next.

6. A rotary indexing apparatus comprising:
- a rotatable table;
- means for locking said rotatable table at each of a plurality of spaced index positions and after a predetermined period of time at each locked index position releasing said table for rotation about its axis to the next succeeding index position;
- drive means including a continuously rotating drive shaft extending upwardly through an axial bore in said table, said drive shaft being free to rotate relative to said table and having a driving gear affixed to an upper portion thereof in spaced relationship with respect to said rotatable table;
- driven means including at least one driven gear normally mutually engaging said driving gear and rotatably mounted on a support shaft, said shaft being connected at its lower end to said rotatable table; and
- resilient storing means intercoupled between at least said one driven gear and said rotatable table, said storing means comprising a helical spring affixed at one end to said table and at the opposite end to the associated driven gear for storing torsional energy imparted thereto intermittently by said driving gear through said driven gear in response to and during each intermittent period in which said rotatable table is locked in a stationary index position, said helical spring rapidly releasing said stored energy intermittently through said driven gear and support shaft to said rotatable table in response to said table being released for rotation, said table upon receiving said stored energy having rotational movement imparted thereto.

7. A rotary indexing apparatus in accordance with claim 6:
- wherein said driven gear is segmented by having a short arcuate portion along the periphery thereof without teeth, said portion of the driven gear without teeth preventing the driving gear from rotating the driven gear through an angle greater than that defined by the peripheral portion of the driven gear with teeth, said segmented driven gear thereby preventing the spring affixed at one end thereto from being wound up excessively should the rotatable table be prevented from rotating at the proper time from one index position to the next.

8. A rotary indexing apparatus in accordance with claim 7 wherein said means for alternately locking and releasing said rotatable table comprises both:
- an intermittently operated electro-magnetic brake for dynamically braking the rotational movement of said table over a predetermined angle of displacement in being indexed from one index position to the next; and
- cam-operated means for positively locking said rotatable table at each predetermined index position and for abruptly releasing said work member for rotation at a predetermined time thereafter.

9. A rotary indexing apparatus in accordance with claim 7:
- wherein a plurality of circumferentially spaced and segmented driven gears are positioned normally to mutually engage said driving gear and to form an epicyclic type of gear drive, each of said driven gears being rotatably mounted on a different support shaft, with each of said shafts being connected at its lower end to the rotatable table, and further comprising
- adjustable means to establish a predetermined amount of preloading of said helical springs while said rotatable table is locked in a stationary index position; and
- adjustable stop means carried by said rotary table for insuring uniform spacing between the various index positions associated therewith.

References Cited

UNITED STATES PATENTS

| | | | |
|---|---|---|---|
| 2,064,452 | 12/1936 | Watson | 74—125.5 X |
| 2,891,405 | 6/1959 | Elmore | 74—1.5 |
| 2,737,278 | 3/1956 | Bartelt | 74—125.5 |
| 2,871,702 | 2/1959 | Tetro. | |
| 2,891,405 | 6/1959 | Elmore | 74.—1.5 |
| 2,914,956 | 12/1959 | Maclay | 74—125.5 |
| 3,072,836 | 1/1963 | Eisengrein | 74—821 X |

MILTON KAUFMAN, *Primary Examiner.*